United States Patent

Phillips et al.

[11] Patent Number: 4,746,323
[45] Date of Patent: May 24, 1988

[54] WATER-SOLUBLE VINYL SULFONYL-TYPE REACTIVE MONOAZO YELLOW DYESTUFFS MIXTURES WITH HIGH COLOR YIELD

[75] Inventors: Thomas S. Phillips, West Warwick; Anthony J. Corso, Coventry, both of R.I.

[73] Assignee: Hoechst Celanese Corporation, Somerville, N.J.

[21] Appl. No.: 88,770

[22] Filed: Aug. 24, 1987

Related U.S. Application Data

[63] Continuation-in-part of Ser. No. 848,888, Apr. 7, 1986, Pat. No. 4,699,624.

[51] Int. Cl.$^4$ .................. C09B 67/02; C09B 62/00
[52] U.S. Cl. .................................. 8/527; 8/549; 8/641; 8/683; 8/913; 534/642; 534/739
[58] Field of Search .................. 8/549, 641, 527

[56] References Cited

U.S. PATENT DOCUMENTS

| | | | |
|---|---|---|---|
| 3,519,616 | 7/1970 | Bauer et al. | 534/739 |
| 4,427,413 | 1/1984 | Bauerle | 8/471 |
| 4,548,613 | 10/1985 | Bode et al. | 8/638 |
| 4,699,624 | 10/1987 | Phillips et al. | 8/524 |

FOREIGN PATENT DOCUMENTS

| | | |
|---|---|---|
| 122599 | 10/1984 | European Pat. Off. |
| 1428633 | 3/1976 | United Kingdom |

*Primary Examiner*—A. Lionel Clingman
*Attorney, Agent, or Firm*—Hugh C. Crall

[57] ABSTRACT

This invention is directed to mixtures of water-soluble, fiber reactive yellow dyestuffs which exhibit superior build-up and color properties over those properties obtained with the individual components of the mixtures. The dyestuffs disclosed herein have the following general formula in their free acid form:

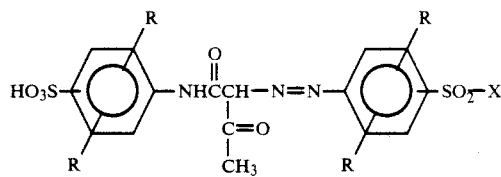

wherein R is lower alkyl, lower alkoxy or hydrogen and wherein X is —CH=CH$_2$ or —CH$_2$CH$_2$—Z wherein Z is —OH, —Cl, —Br, —OSO$_3$H, —SSO$_3$H, OPO$_3$H$_2$ or —N(R$_1$)$_2$, and wherein R$_1$ is lower alkyl or hydrogen.

16 Claims, No Drawings

WATER-SOLUBLE VINYL SULFONYL-TYPE REACTIVE MONOAZO YELLOW DYESTUFFS MIXTURES WITH HIGH COLOR YIELD

CROSS REFERENCE TO RELATED APPLICATIONS:

This application is a continuation-in-part of copending application Ser. No. 848,888 filed in the U.S. Patent and Trademark Office on Apr. 7, 1986; now U.S. Pat. No. 4,699,624.

BACKGROUND OF THE INVENTION

This invention relates to mixtures of water-soluble, fiber-reactive, yellow, azo dyestuffs with superior color yield and improved build-up properties. Color yield as used in this specification is the amount of color spectrally measured in standard color density units imparted by the dyestuff to a fabric or other substrate. Build-up is the ability of a dyestuff to continue to yield deeper or darker shades of a color as the concentration of the dyestuff in the dye bath is increased which is also expressed in color density units.

Typically, the color yield of an admixture of azo-dyestuffs in proportional to the color yield and the amount of the components in the mixture. In general the color yield of a mixture will not exceed the color yield of the strongest component of the mixture. Surprisingly, we have found that the color yield of the azo dyestuff mixtures of this invention are significantly higher than the color yield of individual components. Secondly, these mixtures of the invention have improved build-up properties over the individual components.

An exception to this general rule is reported in British Patent No. 2,108,141 wherein certain mixtures of blue, monoazo disperse dyes are reported having good build-up properties and high tinctorial strength superior to the effect achieved by the application of any single component of the dye mixture. U.S. Pat. No. 4,548,613 reports that certain mixtures of monoazo, yellow disperse dyes (CI Disperse Yellow 54 and 64) produce dyeings of high tinctorial strength, and high dye bath exhaustion. U.S. Pat. No. 4,427,413 discloses other mixtures of these same disperse dyes (CI Disperse Yellow 54 and 64) with improved build-up and better yields in transfer printing. Although these exceptions to the general rule report improved higher color yield or other improved properties they are exceptions.

SUMMARY OF THE INVENTION

This invention is that of a water-soluble, fiber reactive, yellow azo dyestuff mixture comprising a first and a second azo dyestuff having in their free acid form the following general formula (1):

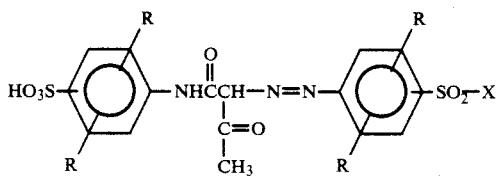

wherein X is —CH=CH$_2$ or —CH$_2$—CH$_2$—Z. The moiety Z may be either OH, —CL, —Br, —OSO$_3$H, —SSO$_3$H, —OPO$_3$H$_2$, or —N(R$_1$)$_2$ wherein the moiety R$_1$ is independently selected from a one to four carbon atom lower alkyl and hydrogen. The moiety R is independently selected from lower alkyl and lower alkoxy groups having one to four carbon atoms and hydrogen; preferably lower alkyl or alkoxy. However, at least one of said R moieties is selected from lower alkyl in at least one of said dyestuffs and each of said dyestuffs contain at least two R groups selected from lower alkoxy whereby the mixture of said first and second dyestuffs results in a dyestuff mixture which upon application has a superior color yield than that of the individual components of the mixture. The dyestuffs mixtures of this invention also have improved build-up properties as the concentration of the dyestuff mixture is increased in the dye bath.

The azo dyestuff mixtures of this invention are useful in coloring the printing fibers and other materials such as leather which contain carbonamide (NH-) and hydroxy (OH-) groups. They provide brilliant yellow shades on cellulose materials and have improved color yield, build-up and fastness properties.

DESCRIPTION OF THE PREFERRED EMBODIMENTS

The present invention is directed to novel mixtures of water-soluble yellow monoazo dyestuffs. The individual dyestuffs may be prepared in the conventional manner by coupling a n-acetoacetyl derivative of an alkyl and/or alkoxy substituted aniline sulfonic acid with a diazotized, fiber-reactive aniline. The coupling reaction is carried out under conventional conditions for the preparation of fiber reactive azo compounds; e.g. in an aqueous medium, at a temperature between 0° and 30° C., preferably 5° to 15° C. and at a pH between 3 and 8 preferably between 4 and 7. Although the following examples use the procedure of preparing each dyestuff separately and then mixing the components, it is apparent that the diazotization and coupling reactions can be sequentially conducted in admixture.

After preparation, the dyestuff may be isolated as a powder, either by salting it out of solution or by spray drying and brought to standard strength by the addition of an inorganic salt. Advantageously, the prepared dyestuff may be recovered as a liquid composition which can be brought to a standard strength by the addition of water. Alternatively, the standardization of the dyestuff mixture may be carried out after mixing the individual components.

The dyestuff mixtutres of the invention comprise a first and a second dyestuff which have the following general formula (1) in their free acid form:

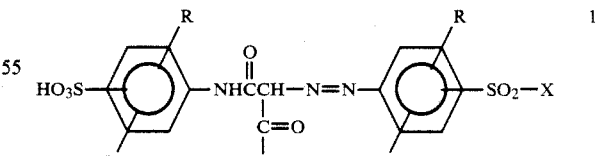

The substituent R is independently selected from lower alkyl and lower alkoxy groups having one to four carbon atoms and hydrogen; preferably lower alkyl and alkoxyl. It being understood that the components of the mixture have different specific formulae. At least one of the dyestuff components in the mixture contains at least one lower alkyl substituent and that each component dyestuff contains at least two lower alkoxy substituents.

The right substituents in the above general formula (1) may be selectively positioned on the rings by known methods readily apparent to one skilled in the art. Preferably, the substituent R is positioned 2,5, 2',5' and the —SO$_2$X, HO$_3$S— moieties are positioned 4 and 4', respectively. Other illustrative isomers have the following ring positions:

R—2,5, 2',5' and SO$_2$X, HO$_3$S— 3,3'
R—2,4, 2', 4' and SO$_2$X, HO$_3$S— 5,5'
R—3,5, 3',5' and SO$_2$X, HO$_3$S— 2,2'
R—2,4, 2',5' and SO$_2$X, HO$_3$S— 5,3'
R—2,5, 2',4' and SO$_2$X, HO$_3$S— 5',4

However, regardless of the isomeric position of the ring substituents, the acetoacetamidazo chromophore of general formula (1) will give a yellow dyestuff. The shade or tone of the yellow dyestuff being dependent upon the type and position of the ring substituents. Similarly, the sulfonic acid moiety may be replaced with a carboxylic acid moiety.

The substituent X is —CH=CH$_2$ or —CH$_2$—CH$_2$—Z in which Z is a moiety that can be eliminated by the action of an alkaline agent. The moiety Z for example may be —OH, —CL, —Br, —OSO$_3$H, —SSO$_3$H, —OPO$_3$H$_2$ or —N(R$_1$)$_2$, where R$_1$ may be a lower alkyl of one to four carbon atoms or hydrogen. Preferably X is the beta-sulfatoethyl group.

Preferred mixtures of this invention comprise mixtures of the following dyestuffs having the following formula:

Mixture I:

Example 2 Dye
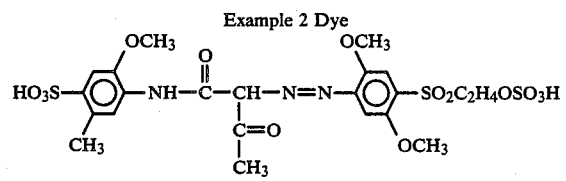

AND

Example 1 Dye
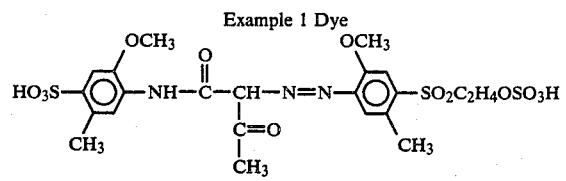

Example 2 Dye
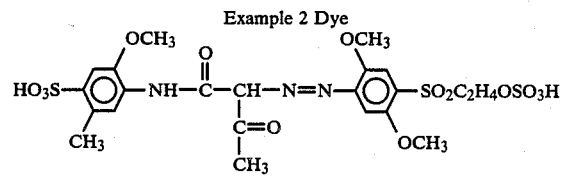

AND

Example 3 Dye
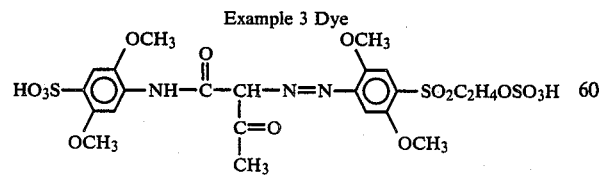

Mixture II:
These dyestuff mixtures (Mixture I and Mixture II) may contain 5% to 95% of the first component, Example 2 Dye, and 95% to 5% of the second component; preferably 80% to 20% of the first component and most preferably 60% about 40% of the first component. The above percentages are weight percent of dye. This basis is used through the remainder of this specification and the claims, unless otherwise noted. It also is understood that the mixed dyestuffs of this invention may be used in conjunction with other dyes.

Another preferred mixture of the invention is:
Mixture III:

Example 1 Dye
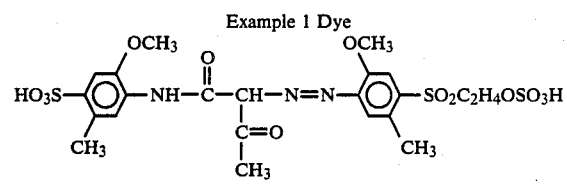

AND

Example 3 Dye
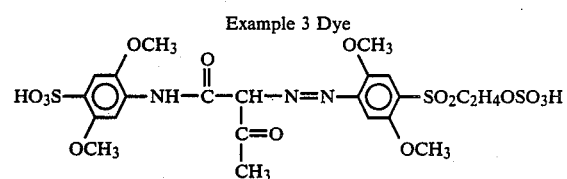

In the above mixture the first component Example 1 Dye may be present in an amount of 95 to 80 percent, preferably about 85% to 90% and most preferably about 85% by weight of the dye. However, when the concentration of the Example 1 Dye component is reduced to less than about 80% a detrimental effect in color yield is observed.

The dyestuff mixtures of the present invention are suitable for the dyeing of cellulosic materials such as cotton, linen, viscose rayon or staple fibers. Then can be applied by any one of the usual dyeing and printing methods for reactive dyestuffs and they yield on cellulosic materials, in the presence of alkaline agents, brilliant yellow shades having excellent fastness properties, and particularly superior color yield and build-up in both exhaust and continuous dyeings. The present dyestuffs may also be used on other fibers containing reactive groups e.g. wool, silk or polyamide fibers.

The following examples further illustrate this invention but are not intended to limit it thereto. The percentages and parts are by weight unless noted otherwise.

EXAMPLE 1

This example illustrates the preparation of a dye having the formula:

Example 1 Dye
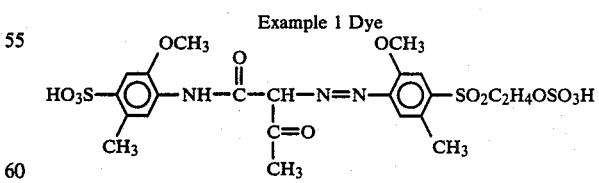

65.0 parts of methoxy-5-methylaniline-4-B-sulfatoethylsulfone were dissolved in 200 parts of water at 35° C. and pH 5.5–6.0 by the addition of 13 parts of sodium carbonate. The resulting solution was cooled to 0°–5° C. with ice and 50 parts of 31% hydrochloric acid were acid. The slurry was diazotized by the addition of 35 parts of a 39.5% sodium nitrite solution. The excess nitrite was decomposed by the addition of 1 part of sulfamic acid. 10 parts of filter aid were added and the diazo solution was clarified and added to an aqueous solution containing 60.2 parts of 2-methoxy-5-methyl-4-sulfo-acetoacetanilide while maintaining the pH at 4.5–5.0 by the addition of 15 parts of sodium carbonate. The resulting dyestuff solution was warmed to 50° C. and the dyestuff salted out by the addition of 300 parts of sodium chloride. After filtration and drying, 143.1 parts of dyestuff were obtained having a strength of 65:100 (i.e., 65 parts of synthesized dyestuff were equal in strength to 100 parts of standard strength dyestuff). The 143.1 parts so obtained were blended with 77.0 parts of anhydrous sodium sulfate to yield 220.1 parts of dyestuff powder of standard strength with a dye content of 58.2% (weight percent).

EXAMPLE 2

This example illustrates the preparation of a dye having the formula

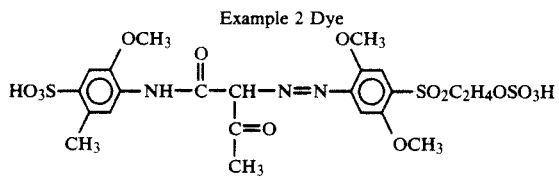

Example 2 Dye 68.2 parts of 2.5-dimethoxyaniline-4-B-sulfoxyethylsulfone were dissolved in 320 parts of water at pH 6.0–6.5 by the addition of 14 parts of sodium carbonate.

28 parts of Celite and 8 parts of Fuller's Earth and 4 parts of Darco S-51 were added and the solution clarified. The filter cake was washed with 100 parts of water. 28 parts of 93% sulfuric were added, the solution iced to 0°–5° C. and diazotized with 33.8 parts of a 40.1% sodium nitrite solution. The excess nitrite was decomposed by the addition of 1 part of sulfamic acid. The diazo solution was then added to a solution containing 56 parts of 2-methoxy-5-methyl-4-sulfo-acetoacetanilide while maintaining the pH at 4-5 by the addition of 16 parts of sodium carbonate. The resulting solution was spray dried to yield 188.3 parts of dyestuff having a strength of 60:100 (i.e., 60 parts of the synthesized dyestuff were were equal in strength to 100 parts of standard strength dyestuff.) The 188.3 parts of dyestuff so obtained were blended with 125.5 parts of anhydrous sodium sulfate to yield 313.8 parts of dyestuff powder of standard strength with a dye content of 42.2% (weight percent).

EXAMPLE 3

This example illustrates the preparation of a yellow monoazo dyestuff wherein the phenyl rings of the compound are methoxy substituted. The compound has the formula:

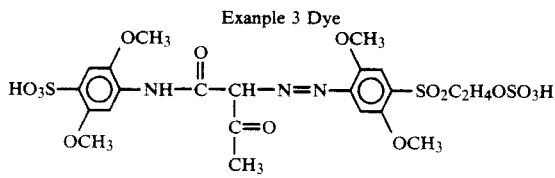

Exanple 3 Dye 102.3 parts of 2,5-dimethoxyaniline-B-sulfatoethylsulfone were dissolved in 480 parts of water by the addition of 20.4 parts of sodium carbonate. 42 parts of Celite, 12 parts of Fuller's Earth and 6 parts of Darco S-51 were added and the solution clarified. The filter cake was washed with 150 parts of water. 42 parts of 93% sulfuric acid were added, the solution cooled to 0°–5° C. with ice, and diazotized by the addition of 51 parts of a 40% sodium nitrite solution. The excess nitrite was decomposed by the addition of 1 part of sulfamic acid. The diazo solution was then added to a solution containing 88.8 parts of 2,5-dimethoxy-4-sulfo-acetoacetanilide and maintaining the pH at 4-5 by the addition of 28 parts of sodium carbonate. The resulting solution was spray dried to yield 300 parts of dyestuff having a strength of 60:100 (i.e., 60 parts of the synthesized dyestuff were equal in strength to 100 parts of standard strength dyestuff). The 300 parts so obtained were blended with 200 parts of sodium chloride to yield 500 parts of dyestuff powder of standard strength with a dye content of 39.4% (weight percent).

The following dyeings were prepared by mixing the dyestuffs of Examples 1–3 in the proportions indicated and applied to test fabrics using a standard exhaust dyeing procedure. The color yield on the dyed test fabrics were analyzed using a spectrophotometer, computer assisted system and determined in color density units. The colorant reported in the Examples is weight percent of dyestuff of standard color strength based upon the weight of the test fabric in the dye bath.

The following exhaust dyeing procedure was used in preparing the dyed specimens upon which color measurements were determined. A 20 gram boiled-off, cotton yarn knitted into socks was used as the fabric. Prior to dyeing the fabric was scoured in an aqueous solution of scouring agent (trade designation Carbapon SR) at a concentration of 0.5 grams per liter for 5 minutes at the boil and then rinsed with hot water.

A dye bath solution was prepared at 80° F. It contained 1.0% based upon the weight of the test fabric of a polyphosphate sequestering agent of the neutral type, common salt, soda ash, caustic soda, and dyestuff. The dyeings were conducted a 1:10 liquor ratio.

An amount of salt, soda ash and caustic soda were added in each dyeing depending on the total concentration of the dyestuff in the dye bath according to the following schedule:

| Dyestuff - % | Salt* | Soda Ash* | Caustic Soda** |
|---|---|---|---|
| 0.01–0.10 | 25.00 | 3.00 | 0 |
| 0.11–0.20 | 25.00 | 5.00 | 0 |
| 0.21–0.50 | 50.00 | 2.00 | 0.50 |
| 0.51–2.00 | 75.00 | 3.00 | 1.50 |
| 2.01–4.00 | 100.00 | 5.00 | 2.50 |

*grams/liter, **50% strength, grams/liter

The dye bath solution and test specimen were sealed in metal cans, heated to 140° F. under agitation at a rate of 2° F. per minute and held at 140° F. for 45 minutes. After completing the 45 minute dyeing period, the specimens were rinsed with cold running tap water until bleeding stopped. They were then neutralized with a 1% solution of acetic acid (56% strength) for one minute at 160° F., washed with a 0.25% soap solution for 3 minutes at 200°–210° F., rinsed for five minutes at 160° F. and dried. The term liquor ratio as used in the foregoing description is the weight ratio of fabric to dye bath solution.

Dyeing were prepared by the foregoing procedure using the individual component dyestuffs and mixtures of the dyestuffs. The results are as follows. Color yield is reported in color density units (CDU). The actual dye content of the colorants used in the following examples were as follows: Ex. 1—Dye—58.2%, Ex. 2 Dye—42.2%, and Ex. 3 Dye—39.4% by weight.

| Color Yield | | | |
|---|---|---|---|
| % Colorant | Example 2 Dye | Example 1 Dye | 50:50 Mix |
| 1 | .251 | .308 | .275 |
| 2 | .436 | .469 | .497 |
| 4 | .638 | .505 | .732 |
| 6 | .766 | .558 | .916 |
| 8 | .759 | .578 | .938 |
| 10 | .706 | .560 | .935 |
| % Colorant | Example 2 Dye | Example 3 | 50:50 Mix |
| 1 | .202 | .211 | .208 |
| 2 | .382 | .271 | .337 |
| 4 | .591 | .355 | .567 |
| 6 | .654 | .434 | .727 |
| 8 | .681 | .399 | .817 |
| 10 | .683 | .458 | .858 |
| % Colorant | Example 1 Dye | Example 3 Dye | 80:20 Mix |
| 1 | .347 | .248 | .320 |
| 2 | .482 | .384 | .539 |
| 4 | .531 | .503 | .685 |
| 6 | .631 | .565 | .777 |
| 8 | .641 | .581 | .809 |
| 10 | .609 | .552 | .825 |

The following dyeings were at a 4% dyestuff concentration using varying percentages of the individual components.

| 4% Exhaust Dyeing | | |
|---|---|---|
| Example 2 Dye | Example 1 Dye | Color Yield |
| 100 | 0 | .672 |
| 80 | 20 | .741 |
| 60 | 40 | .807 |
| 50 | 50 | .871 |
| 40 | 60 | .907 |
| 20 | 80 | .713 |
| 0 | 100 | .513 |
| Example 2 Dye | Example 3 Dye | Color Yield |
| 100 | 0 | .754 |
| 80 | 20 | .797 |
| 60 | 40 | .837 |
| 50 | 50 | .813 |
| 40 | 60 | .772 |
| 20 | 80 | .730 |
| 0 | 100 | .507 |
| Example 1 Dye | Example 3 Dye | Color Yield |
| 100 | 0 | .677 |
| 80 | 20 | .844 |
| 60 | 40 | .314 |
| 50 | 50 | .244 |
| 40 | 60 | .246 |
| 20 | 80 | .265 |
| 0 | 100 | .593 |
| 2% Exhaust Dyeing | | |
| Example 1 Dye | Example 3 Dye | Color Yield |
| 100 | 0 | .455 |
| 80 | 20 | .564 |
| 60 | 40 | .190 |
| 50 | 50 | .175 |
| 40 | 60 | .171 |
| 20 | 80 | .224 |
| 0 | 100 | .374 |

The dyestuff mixtures of this invention may be prepared and used as liquid dyestuff solutions of standard color strength. Preferably, these liquid dyestuff compositions should be adjusted to a pH of about 2.5 to about 4.5 to provide maximum storage stability and dye performance properties. These compositions also should be substantially free of buffer substances and have a low inert inorganic salt content. Inert inorganic salts are those which do not react with the dyes such as sodium sulfate, sodium chloride, potassium sulfate, potassium chloride etc.

Additional specific dye mixtures which exhibit the improved color yield properties follow.

Mixture IV

Example 1 dye and a dye of the formula (Example 4 Dye):

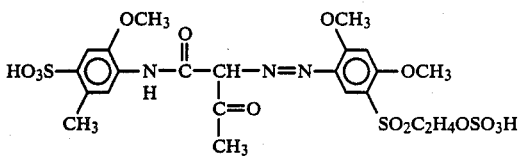

The preparation of the above dye follows.

EXAMPLE 4

Dye 60.3 parts of 2,4-dimethoxyaniline-5-B-hydroxyethylsulfone were added to 225 parts of sulfuric acid while maintaining the temperature at less than 35° C. and then stirred overnight at room temperature. This solution containing the B-sulfooxyethylsulfone product was drowned onto ice and water while maintaining the temperature at less than 2° C. and then diazotized by the addition of 47.5 parts of a 40.1% solution of sodium nitrite. The excess nitrite was decomposed by the addition of 4 part of sulfamic acid. The solution was clarified and yielded 1388 parts of a solution containing the diazonium component.

To 694 parts of the above prepared diazonium solution were added, at a temperature of at 0°–5° C., 109.4 parts of sodium carbonate to adjust the pH to 5.0. The diazo solution was then added to a solution containing 30.1 parts of 2-methoxy-5-methyl-4-sulfo-acetoacetanilide while maintaining the pH at 5–5.5 by the addition of 4.4 parts of sodium carbonate. The coupling reaction was stirred 30 minutes, cooled to 7° C. and filtered to remove the precipitated sodium sulfate. 820 parts of an aqueous dyestuff solution were obtained which, after analysis, was shown to have a dyestuff content of 11.0%.

Mixture V

Example 1 Dye and a dye of the formula (Example 5 Dye):

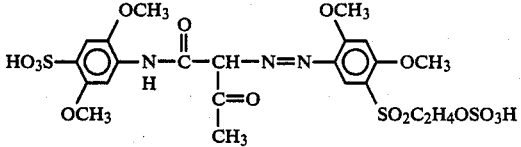

The preparation of the above dye follows:

EXAMPLE 5

Dye

To 694 parts of the diazonium solution of 2,4-dimethoxylaniline-5-B-sulfooxyethylsulfone prepared in Example 4 was added, at a temperature of 0°–5° C., 110.0 parts of sodium carbonate to pH 5. The diazo solution was added to an aqueous solution containing 31.7 parts of 2,5-dimethoxy-4-sulfo-acetoacetanilide while maintaining the pH at 5-5.5 by the addition of 4.7 parts of sodium carbonate. The coupling reaction was stirred 30 minute, cooled to 7° C. and filtered to remove the precipitated sodium sulfate. 640.5 parts of an aqueous dyestuff solution were obtained which, after analysis, was shown to have a dyestuff content of 11.3%.

Mixture VI

Example 1 Dye and a dye of the formula (Example 6 Dye):

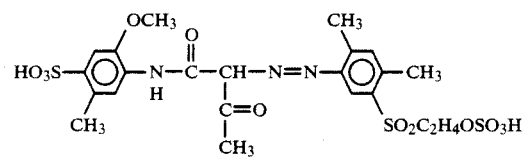

The preparation of the above dye follows:

EXAMPLE 6

Dye 100 parts of 2,4-dimethylaniline-5-B-hydroxyethylsulfone were added to 300 parts of sulfuric acid while maintaining the temperature less than 35° C., and then stirred overnight at room temperature. This solution containing the B-sulfooxyethylsulfone product was then drowned onto an ice/water slurry and filtered. 270 parts of a wet presscake were obtained containing 111.5 parts of 2,4-dimethylaniline-5-B-sulfooxyethylsulfone.

135 parts of the presscake obtained above were dissolved in 1000 parts of water and at a temperature of 5°-10° C. diazotized by the addition of 31.1 parts of a 40.1% solution of sodium nitrite. The excess nitrite was decomposed by the addition of 1 part of sulfamic acid. The pH was adjusted to 4.5-5.5 with sodium carbonate and 54.1 parts of 2-methoxy-5-methyl-4-sulfoacetoacetanilide were added while maintaining the pH at 4.5-5.5 by the addition of sodium carbonate. The solution was spray dried to yield 148.1 parts of product which, after analysis, was shown to have a dye content of 78.2%.

Mixture VII

Example 1 dye and a dye of the formula (Example 7 Dye):

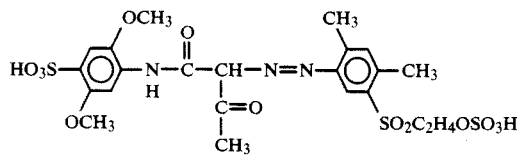

The preparation of the above dye follows:

EXAMPLE 7

Dye 135 parts of the 2,4-dimethylaniline-5-B-sulfooxyethylsulfone prepared in Example 6 were dissolved in 100 parts of water and at a temperature of 5°-10° C. diazotized by the addition of 31.1 parts of a 40.1% solution of sodium nitrite. The excess nitrite was decomposed by the addition of 1 parts of sulfamic acid. The pH of the diazo solution was adjusted to 4.5-5.5 with sodium carbonate and 54.4 parts of 2,5-dimethoxy-4-sulfoacetoacetanilide were added while maintaining the pH at 4.5-5.5 with sodium carbonate. The solution was spray dried to yield 155.0 parts of product which, after analysis, was shown to have a dyestuff content of 75.8%.

Mixture VIII

Example 1 Dye and a dye of the formula (Example 8 Dye):

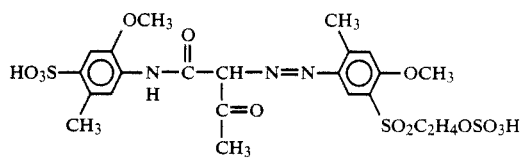

The preparation of the above dye follows:

EXAMPLE 8

Dye 100 parts of 2-methyl-4-methoxyaniline-5-B-hydroxyethylsulfone were added to 300 parts of sulfuric acid while maintaining the temperature below 35° C. and then stirred overnight at room temperature. To this sulfuric acid solution containing the B-sulfooxyethylsulfone product was added 155 parts of a 32.7% solution of nitrosylsulfuric acid. The reaction was drowned onto an ice/water slurry at a temperature of 5°-10° C. and yielded 1540 parts of an aqueous solution containing the diazonium compound.

590 parts of the above prepared diazo solution were added to a solution containing 45.2 parts of 2-methoxy-5-methyl-4-sulfoacetoacetanilide while maintaining the pH at 4-6 by the addition of 173 parts of sodium carbonate. The solution was cooled to 10° C. and the precipitated sodium sulfate removed by filtration. 1178 parts of an aqueous solution were obtained which, after analysis, was shown to have a dyestuff content of 8.1%.

Mixture IX

Example 1 Dye and a dye of the formula (Example 9):

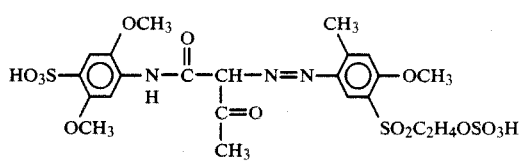

The preparation of the above dye follows:

EXAMPLE 9

Dye 646 parts of the diazo solution prepared in Example 8 were added to an aqueous solution containing 47.6 parts of 2,5-dimethoxy-4-sulfoacetoacetanilide while maintaining the pH at 4-6 by the addition of sodium carbonate. The solution was cooled to 10° C. and the precipitated sodium sulfate removed by filtration. 1238 parts of an aqueous solution were obtained which, after analysis, was shown to have a dye content of 8.8%

Mixture X

Example 2 Dye and Example 5 Dye.

Mixture XI

Example 2 Dye and Example 6 Dye.

Mixture XII

Example 2 Dye and Example 7 Dye.
Mixture XIII
Example 2 Dye and Example 8 Dye.
Mixture XIV
Example 2 Dye and Example 9 Dye.

The above listed dye mixtures produced an increase in color yield over the entire concentration range except Mixture X where an increase in color yield from about 95 weight percent of Example 2 Dye to about 78 weight percent of Example 2 Dye was observed. In the concentration below about 70 weight percent to about 30 weight percent of Example 2 Dye a loss color yield was obtained, i.e. the color yield was less than the proportional color yield of the individual components in mixture. However, at concentration below about 30 weight percent of Example 2 dye to about 5 weight an increase in order yield was observed; a maximum increase of about 20-25 percent at a concentration of about 25% of Example 2 Dye.

Generally, mixtures of isomeric yellow dyes represented by the general formula (1) gave an unexpected increase in color yield over the entire concentration range (from about 5 to about 95 weight percent); a few exceptions did not. For example, a mixture of Example 2 and Example 4 dyes resulted in a decrease in color yield over the entire concentration range. Similarily, only a slight increase in color yield was observed with mixtures of Examples 6 and 7 Dyes and Examples 8 and 9 Dyes. A mixture of Example 4 and 5 Dyes performed similarly to Mixture X but the increase in color yield was not as high. The experimental data of these dye mixtures follows: The tables present the ratio of each dye in the mixure based up the dye content of each component and the color yield of the mixture as measured in color density units as previously explained.

| Mixture IV | | |
|---|---|---|
| Ex. 1 Dye | Ex. 4 Dye | Color Yield (CDU) |
| 1.00 | 0.00 | 0.637 |
| 0.74 | 0.26 | 0.790 |
| 0.48 | 0.52 | 0.821 |
| 0.24 | 0.76 | 0.767 |
| 0.00 | 1.00 | 0.781 |

| Mixture V | | |
|---|---|---|
| Ex. 1 Dye | Ex. 5 Dye | Color Yield (CDU) |
| 1.00 | 0.00 | 0.696 |
| 0.75 | 0.25 | 0.830 |
| 0.50 | 0.50 | 0.819 |
| 0.25 | 0.75 | 0.710 |
| 0.00 | 1.00 | 0.629 |

| Mixture VI | | |
|---|---|---|
| Ex. 1 Dye | Ex. 6 Dye | Color Yield (CDU) |
| 1.00 | 0.00 | 0.598 |
| 0.65 | 0.35 | 0.738 |
| 0.38 | 0.62 | 0.626 |
| 0.17 | 0.83 | 0.528 |
| 0.00 | 1.00 | 0.451 |

| Mixture VII | | |
|---|---|---|
| Ex. 1 Dye | Ex. 7 Dye | Color Yield (CDU) |
| 1.00 | 0.00 | 0.391 |
| 0.68 | 0.32 | 0.657 |
| 0.41 | 0.59 | 0.498 |
| 0.19 | 0.81 | 0.461 |
| 0.00 | 1.00 | 0.351 |

| Mixture VIII | | |
|---|---|---|
| Ex. 1 Dye | Ex. 8 Dye | Color Yield (CDU) |
| 1.00 | 0.00 | 0.291 |
| 0.71 | 0.29 | 0.628 |
| 0.45 | 0.55 | 0.575 |
| 0.22 | 0.78 | 0.579 |
| 0.00 | 1.00 | 0.470 |

| Mixture IX | | |
|---|---|---|
| Ex. 1 Dye | Ex. 9 Dye | Color Yield (CDU) |
| 1.00 | 0.00 | 0.266 |
| 0.72 | 0.28 | 0.593 |
| 0.45 | 0.55 | 0.580 |
| 0.22 | 0.78 | 0.452 |
| 0.00 | 1.00 | 0.226 |

| Mixture X | | |
|---|---|---|
| Ex. 2 Dye | Ex. 5 Dye | Color Yield (CDU) |
| 1.00 | 0.00 | 0.782 |
| 0.74 | 0.26 | 0.799 |
| 0.48 | 0.52 | 0.508 |
| 0.24 | 0.76 | 0.755 |
| 0.00 | 1.00 | 0.576 |

| Mixture XI | | |
|---|---|---|
| Ex. 2 Dye | Ex. 6 Dye | Color Yield (CDU) |
| 1.00 | 0.00 | 0.661 |
| 0.64 | 0.36 | 0.703 |
| 0.36 | 0.64 | 0.688 |
| 0.16 | 0.84 | 0.578 |
| 0.00 | 1.00 | 0.477 |

| Mixture XII | | |
|---|---|---|
| Ex. 2 Dye | Ex. 7 Dye | Color Yield (CDU) |
| 1.00 | 0.00 | 0.693 |
| 0.68 | 0.32 | 0.750 |
| 0.41 | 0.59 | 0.730 |
| 0.19 | 0.81 | 0.699 |
| 0.00 | 1.00 | 0.394 |

| Mixture XIII | | |
|---|---|---|
| Ex. 2 Dye | Ex. 8 Dye | Color Yield (CDU) |
| 1.00 | 0.00 | 0.673 |
| 0.69 | 0.31 | 0.769 |
| 0.43 | 0.57 | 0.712 |
| 0.20 | 0.80 | 0.697 |
| 0.00 | 1.00 | 0.652 |

| Mixture XIV | | |
|---|---|---|
| Ex. 2 Dye | Ex. 9 Dye | Color Yield (CDU) |
| 1.00 | 0.00 | 0614 |
| 0.70 | 0.30 | 0.750 |
| 0.44 | 0.56 | 0.780 |
| 0.21 | 0.79 | 0.673 |
| 0.00 | 1.00 | 0.412 |

| Mixture XV | | |
|---|---|---|
| Ex. 2 Dye | Ex. 4 Dye | Color Yield (CDU) |
| 1.00 | 0.00 | 0.802 |
| 0.72 | 0.28 | 0.771 |
| 0.46 | 0.54 | 0.732 |
| 0.22 | 0.78 | 0.725 |
| 0.00 | 1.00 | 0.735 |

| Mixture XVI | | |
|---|---|---|
| Ex. 6 Dye | Ex. 7 Dye | Color Yield (CDU) |
| 1.00 | 0.00 | 0.371 |
| 0.73 | 0.27 | 0.370 |
| 0.51 | 0.49 | 0.388 |
| 0.23 | 0.77 | 0.409 |
| 0.00 | 1.00 | 0.384 |

| Mixture XVII | | |
|---|---|---|
| Ex. 8 Dye | Ex. 9 Dye | Color Yield (CDU) |
| 1.00 | 0.00 | 0.498 |
| 0.75 | 0.25 | 0.448 |
| 0.50 | 0.50 | 0.439 |
| 0.25 | 0.75 | 0.384 |
| 0.00 | 1.00 | 0.284 |

| Mixture XVIII | | |
|---|---|---|
| Ex. 4 Dye | Ex. 5 Dye | Color Yield (CDU) |
| 1.00 | 0.00 | 0.768 |
| 0.77 | 0.23 | 0.759 |
| 0.52 | 0.48 | 0.467 |

| | | |
|---|---|---|
| 0.27 | 0.73 | 0.656 |
| 0.00 | 1.00 | 0.582 |

These foregoing examples are presented by way of illustration of the invention rather than for purposes of limitation. Other illustrative dyes mixtures include mixtures of the Example 3 dye with any of the foregoing Examples 4–9 dyes.

We claim:

1. A water-soluble, fiber-reactive, yellow, azo dyestuff mixture comprising a first and a second, azo dyestuff having the following general formula in their free acid form:

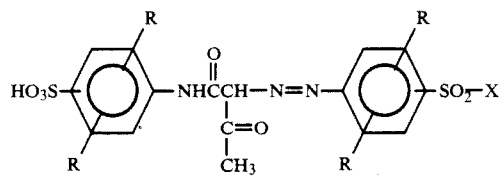

wherein X is —CH=CH$_2$ or —CH$_2$—CH$_2$—Z wherein Z is —OH, —Cl, —Br, —OSO$_3$H, —SSO$_3$H, —OPO$_3$H$_2$ or —N(R$_1$)$_2$, wherein R$_1$ is independently selected from a one to four carbon-atom, lower alkyl and hydrogen;

wherein said first dye, the moieties R are positioned in ring positions 2,5,2′,5′ and wherein the moieties —SO, —X, —HO$_3$S— are positioned in ring positions 4,4′;

wherein said second dye, the moieties R are positioned in ring positions 2,5,2′,4′ and the moiety —HO$_3$S— is positioned in ring position 4 and the moiety —SO$_2$—X is positioned in ring position 5′;

wherein the moiety R is independently selected from lower alkyl and lower alkoxy having one to four carbon atoms with the proviso: (1) that said first or said second dye contain at least one R moiety selected from lower alkyl; (2) that each of said dye contain at least two R moieties selected from lower alkoxy and (3) that the mixture of said dye has a higher color yield value than the color yield value of said first or said second dyestuff.

2. The dye mixture according to claim 1 wherein R is independently selected from lower alkyl of the group methyl, ethyl, propyl and butyl and lower alkoxy of the methoxy, ethoxy, propoxy and butoxy.

3. The dye mixture according to claim 2 wherein said first azo-dye has the formula:

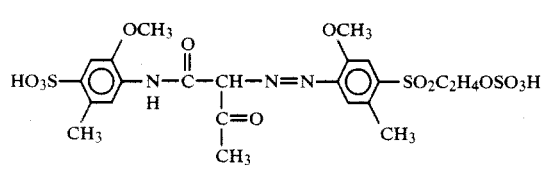

and said second azo-dye has the formula:

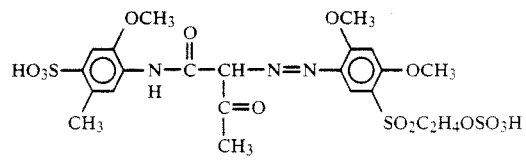

4. The dye mixture according to claim 2 wherein said first azo-dye has the formula:

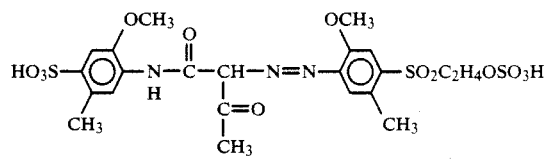

and said second azo-dye has the formula:

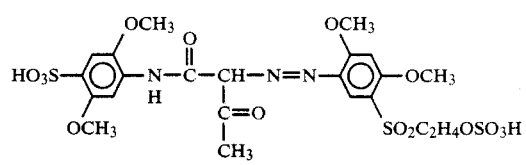

5. The dye mixture according to claim 2 wherein said first azo-dye has the formula:

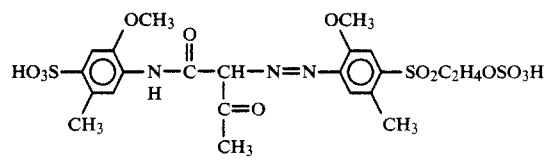

and said second azo-dye has the formula:

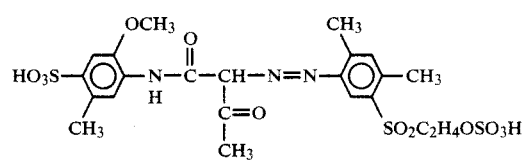

6. The dye mixture according to claim 2 wherein said first azo-dye has the formula:

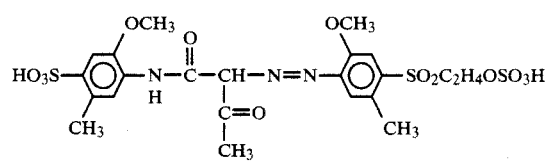

and said second azo-dye has the formula:

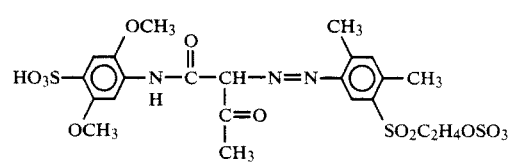

7. The dye mixture according to claim 2 wherein said first azo-dye has the formula:

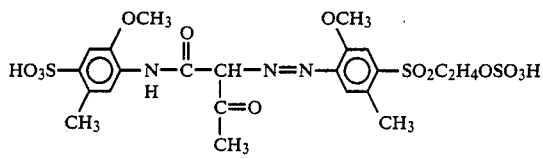

and said second azo-dye has the formula:

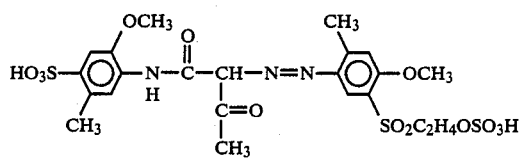

8. The dye mixture according to claim 2 wherein said first azo-dye has the formula:

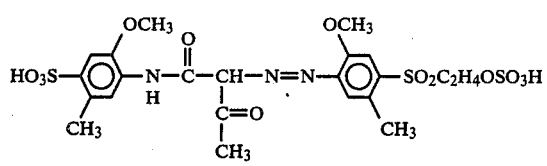

and said second azo-dye has the formula:

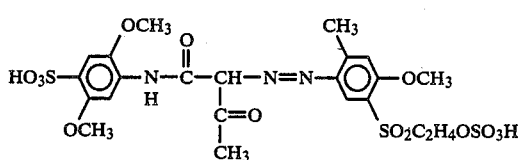

9. The dye mixture according to claim 2 wherein said first azo-dye has the formula:

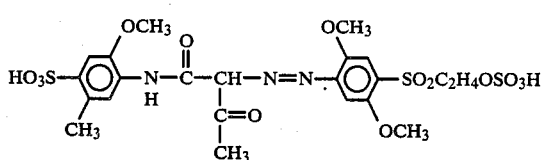

and said second azo-dye has the formula:

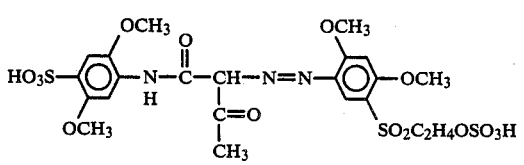

10. The dye mixture according to claim 2 wherein said first azo-dye has the formula:

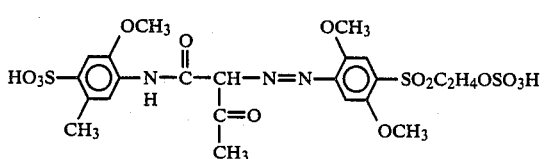

and said second azo-dye has the formula:

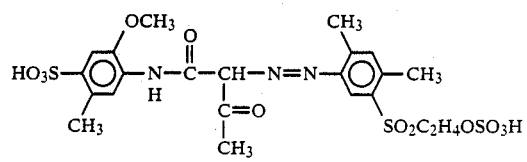

11. The dye mixture according to claim 2 wherein said first azo-dye has the formula:

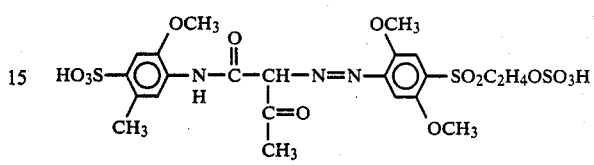

and said second azo-dye has the formula:

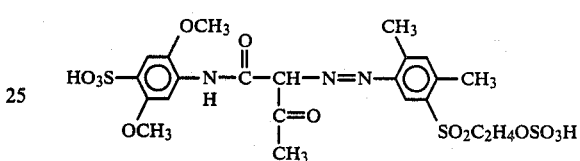

12. The dye mixture according to claim 2 wherein said first azo-dye has the formula:

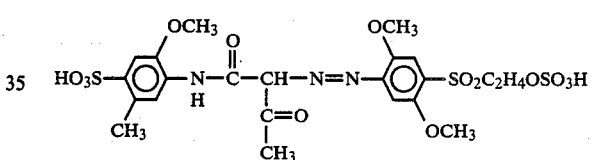

and said second azo-dye has the formula:

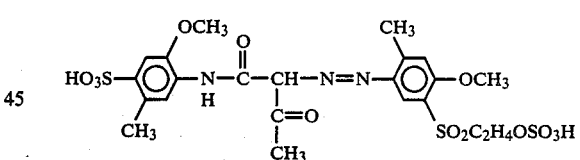

13. The dye mixture according to claim 2 wherein said first azo-dye has the formula:

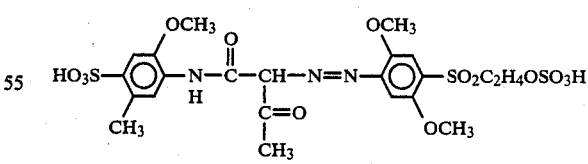

and said second azo-dye has the formula:

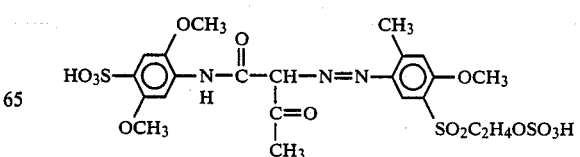

14. A dyestuff mixture according to claim 1, 2, 3, 4, 5, 6, 7, 8, 10, 12, or 13 wherein said first dye is present in an amount from about 5 to about 95 percent by weight.

15. A dyestuff mixture according to claim 1, 2, 3, 4, 5, 6, 7, 8, 10, 11, 12 or 13 wherein said first dye is present in an amount from about 20 to about 80 percent by weight.

16. An aqueous liquid dyestuff composition comprising a dye mixture according to claim 1, 2, 3, 4, 5, 6, 7, 8, 10, 11, 12 or 13, said dye mixture being present in an amount from about 10 to 20 weight percent based upon the weight of said liquid dyestuff composition; said liquid composition having a pH from about 2.5 to about 4.5 and having an inert inorganic salt content of not more than about 6 percent by weight of said liquid composition.

* * * * *